US011179887B2

(12) United States Patent
Tuck et al.

(10) Patent No.: US 11,179,887 B2
(45) Date of Patent: Nov. 23, 2021

(54) ADDITIVE MANUFACTURING

(71) Applicant: The University of Nottingham, Nottingham (GB)

(72) Inventors: Christopher John Tuck, Derby (GB); Belén Begines Ruiz, Dos Hermanas (ES); Yinfeng He, Nottingham (GB); Ricky Darren Wildman, Nottingham (GB); Richard James Mackenzie Hague, Nottingham (GB)

(73) Assignee: The University of Nottingham, Nottingham (GB)

( * ) Notice: Subject to any disclaimer, the term of this patent is extended or adjusted under 35 U.S.C. 154(b) by 308 days.

(21) Appl. No.: 16/405,756

(22) Filed: May 7, 2019

(65) Prior Publication Data
US 2019/0263058 A1 Aug. 29, 2019

Related U.S. Application Data

(63) Continuation of application No. PCT/GB2017/053338, filed on Nov. 7, 2017.

(30) Foreign Application Priority Data

Nov. 7, 2016 (GB) ..................... 1618762

(51) Int. Cl.
*B29C 64/165* (2017.01)
*B33Y 10/00* (2015.01)
(Continued)

(52) U.S. Cl.
CPC ............ *B29C 64/165* (2017.08); *B29C 64/20* (2017.08); *B33Y 10/00* (2014.12); *B33Y 30/00* (2014.12); *B33Y 70/00* (2014.12); *B29K 2075/00* (2013.01)

(58) Field of Classification Search
CPC ....... B29C 64/165; B29C 64/20; B33Y 10/00; B33Y 30/00; B33Y 70/00
See application file for complete search history.

(56) References Cited

U.S. PATENT DOCUMENTS 7,455,804 B2* 11/2008 Patel ..................... B33Y 30/00
264/460
8,287,794 B2 10/2012 Pax et al.
(Continued)

FOREIGN PATENT DOCUMENTS

| WO | WO 02/064354 A1 | 8/2002 |
| WO | WO 2005/044544 A1 | 5/2005 |
| WO | WO 2013/091003 A1 | 6/2013 |

OTHER PUBLICATIONS

Hellmann et al.; Compact Polymeric 3D Prints of High Stability; Journal of Materials Research, vol. 29, No. 17, Sep. 14, 2014; pp. 1833-1840; Cambridge University Press, United Kingdom.

*Primary Examiner* — Mary Lynn F Theisen
(74) *Attorney, Agent, or Firm* — Reinhart Boerner Van Deuren P.C.

(57) ABSTRACT

A method (300) of fabricating an object by additive manufacturing comprises providing (310) a layer of polymeric material (100), said polymeric material (100) being in particulate form, and comprising linear polymer chains, selectively depositing (320) a reactive liquid (200) onto the layer of particulate polymeric material (100), said reactive liquid (200) comprising reactive units (210a) which are monomeric units, linear oligomeric units, linear polymeric units, or combinations thereof, wherein said reactive units (210a) have two or fewer reactive groups, and allowing (330) linear polymeric chains in said layer of polymeric material (100) to react with reactive units in said reactive liquid (200) so as to form extended polymeric chains that are linear, so as to provide a shaped layer of linear polymer. These steps (310,
(Continued)

320, 330) are repeated as required to form the object from successive shaped layers of linear polymer.

20 Claims, 3 Drawing Sheets

(51) Int. Cl.
*B33Y 30/00* (2015.01)
*B33Y 70/00* (2020.01)
*B29C 64/20* (2017.01)
*B29K 75/00* (2006.01)

(56) References Cited

U.S. PATENT DOCUMENTS

| | | |
|---|---|---|
| 8,961,167 B2 | 2/2015 | Swanson et al. |
| 2005/0080191 A1* | 4/2005 | Kramer ............... C08F 8/00 525/191 |
| 2016/0067917 A1 | 3/2016 | Hirata et al. |

* cited by examiner

☒ Reactive Group A 210a
☒ Reactive Group B 110

ADDITIVE MANUFACTURING

CROSS-REFERENCE TO RELATED PATENT APPLICATIONS

This patent application is a continuation of International Patent Application No. PCT/GB2017/053338, filed Nov. 7, 2017, which claims the benefit of GB Patent Application No. 1618762.7, filed Nov. 7, 2016, the entire teachings and disclosure of which are incorporated herein by reference thereto.

FIELD OF THE INVENTION

This invention relates to methods and apparatus for additive manufacturing of objects, and to the objects so produced. More specifically, the invention relates to additive manufacturing of polymeric objects, for example using jetting techniques. Additive manufacturing may also be referred to as 3D printing.

BACKGROUND OF THE INVENTION

Currently known additive manufacturing/3D printing techniques fall into seven categories, as defined by the American Society for Testing and Materials (ASTM) group:
Vat Photopolymerisation
  Shaped layers of a liquid photopolymer in a container are cured with light (usually UV) to form an object within the container;
Material Jetting
  Material is applied in droplets, layer by layer;
Binder Jetting
  Two materials are used—a powder and a liquid binder which is jetted onto the powder and glues particles of the powder together;
Material Extrusion
  A material is extruded and then set, for example by cooling for a melted polymer or metal;
Powder Bed Fusion
  A powder is sintered together using an electron beam, laser and/or heat.
Sheet Lamination
  Sheets of a material are laminated together by an external force, e.g. ultrasonic welding for metals;
Directed Energy Deposition
  A material is deposited on a surface and an energy source (e.g. laser or electron beam) melts it to form a solid object.

WO 2005/044544 (A1) teaches a method which is a variant on binder jetting. The liquid binder is used to cross-link the powder and itself includes polymerisable monomers as well as a polymerisation accelerator. The powder includes a polymerisation initiator. The cement formed by mixing the liquid and the powder is cured, using radiation, to form the finished 3D object. The resultant cross-linking between the polymer particles and with the monomers in the liquid provides toughness and fracture resistance of the printed object.

WO 02/064354 (A1) teaches a similar method which is also a variant on binder jetting—the liquid dissolves the polymeric powder and then either catalyses a reaction of the powder or reacts with the powder to produce a viscous resin. In either case, the resin is then cured using UV light, so cross-linking the polymers, thereby forming a 3D object.

SUMMARY OF THE INVENTION

According to a first aspect of the invention, there is provided a method of fabricating an object by additive manufacturing, the method comprising:
a) providing a layer of polymeric material, said polymeric material being in particulate form, and comprising linear polymer chains,
b) selectively depositing a reactive liquid onto the layer of particulate polymeric material, said reactive liquid comprising reactive units which are monomeric units, linear oligomeric units, linear polymeric units, or combinations thereof, wherein said reactive units have two or fewer reactive groups,
c) allowing linear polymeric chains in said layer of polymeric material to react with reactive units in said reactive liquid so as to form extended polymeric chains that are linear, so as to provide a shaped layer of linear polymer, and
d) repeating steps a) to c) as required to form the object from successive shaped layers of linear polymer.

The method of the present invention may be referred to as particle-based reactive 3D printing, because it involves polymeric particles as a starting material and these particles are reacted with monomeric units and/or linear oligomeric units and/or linear polymeric chains to extend the linear polymeric chains in the polymer particles, to create longer linear polymeric chains. This contrasts with techniques where polymer particles are melted or dissolved, or are cured or cross linked together.

A benefit of the present invention arises from the fact that the method can be carried out quickly and efficiently. The method is able to be carried out faster than prior techniques and is more streamlined.

There is also a lower energy requirement than prior techniques, e.g. there is no need for an electron beam or a laser or a UV or infrared source.

There is also a lower equipment cost as compared to prior techniques.

In general, in the present method printing speed is increased, so allowing more or larger objects to be produced more quickly and making the technique more economically viable for mass production.

Another benefit of the present invention arises from the fact that the reactive liquid deposited in step b) can penetrate into the gaps between the particles in the layer of polymeric material. This means that the reactive liquid serves to fill these gaps, meaning that following the reaction step c) the resulting shaped layer of linear polymer has a low porosity.

The object as formed by the present method may be rigid or may be flexible, but is solid in the sense that it does not flow at room temperature and pressure. In contrast, although the particles that make up particulate polymeric material are each individually solid, the particulate polymeric material can flow. The particulate polymeric material may be referred to as a powder.

In one embodiment, in step c) monomeric units and/or linear oligomeric units react with each other, in addition to reacting with linear polymer chains in the layer of polymeric material. Thus in one embodiment extended polymeric chains are formed via a step growth reaction.

In one embodiment the polymeric material provided in step a) is a thermoplastic material. In one such embodiment the shaped layer of linear polymer is also thermoplastic. In one such embodiment the object as formed is also thermoplastic.

A thermoplastic material is a material which becomes soft and pliable on heating and hardens on cooling, and is able to repeat these processes. By contrast, thermosetting materials do not soften when heated once they have been moulded and cured, and they cannot be reshaped.

FIG. 1 illustrates different polymer structures. Cross-linked polymers, labelled 3 in FIG. 1, are thermosetting materials. Cross-linked materials cannot dissolve in solvents, because all of the polymer chains are covalently interlinked. By contrast, linear polymers (labelled 1 in FIG. 1) and branched polymers (labelled 2 in FIG. 1) can generally be re-processed upon heating (or by dissolution in a suitable solvent). Most linear and branched polymers are therefore thermoplastic materials.

As noted above, the present invention is directed to linear polymers.

Thermoplastic materials offer various advantages as compared to thermosetting materials, including one or more of the following:
 reformable, so material can be re-used;
 more easily recyclable, so reducing environmental impact.

In step c) the extended polymeric chains that are formed are linear rather than cross linked or branched. Thus step c) should suitably be carried out under conditions that do not favour cross linking. In particular, crosslinking agents should not be present.

The monomeric units and/or linear oligomeric units, and/or linear polymeric units that are provided as reactive units in step b) each have no more than two reactive groups. This is advantageous in that it serves to prevent cross-linking occurring in step c). As noted above, in the present invention the shaped layer that is formed in step c) is made of linear polymer. It is not branched or cross-linked.

The monomeric units and/or linear oligomeric units, and/or linear polymeric units that are provided as reactive units in step b) are preferably bi-functional—i.e. having exactly two reactive groups. As noted above, having two groups (rather than three or more) is advantageous in that it serves to prevent cross-linking occurring. Further, by having two reactive groups, rather than one, the reaction does not terminate the extended polymeric chain but instead leaves a reactive functional group available for reaction.

In one embodiment the reactive liquid provided in step b) does not include any reactive units that have more than two reactive groups. Thus in this embodiment all reactive units (whether monomeric, oligomeric or polymeric) that are present in the reactive liquid each have one or two reactive groups.

In one embodiment 50 wt % or more (e.g. 60 wt % or more or 70 wt % or more or 80 wt % or more or 90 wt % or more or 95 wt % or more) of the reactive units (whether monomeric, oligomeric or polymeric) that are present in the reactive liquid are bi-functional, i.e. they each have exactly two reactive groups.

In one embodiment the particulate polymeric material is a thermoplastic polymeric material. The method of the first aspect of the invention allows the thermoplastic nature of the material to be conserved because the extended polymeric chains that are formed are linear rather than branched or cross linked. Thus in one embodiment, the particulate polymeric material is a thermoplastic polymeric material, and the object as formed is made of thermoplastic polymeric material.

In the method of the first aspect the particulate material is not melted or dissolved by the reactive liquid; rather, polymerisation reactions occur between the reactive liquid and the particulate polymeric material.

In some embodiments of the invention no UV light, or other photonic radiation, is needed for the reaction. Instead, the reactive liquid and the particulate polymeric material react when in contact with each other without the need for any light to be supplied. This has advantages of simplicity and cost effectiveness In one embodiment step c) is carried out without the provision of a UV light source. In one embodiment step c) is carried out without the provision of any curing light source.

In some embodiments no heat is needed for the reaction. Instead, the reactive liquid and the particulate polymeric material react when in contact with each other without the need for any heat to be supplied. This has advantages of simplicity and cost effectiveness. However, embodiments are envisaged where heat is used to assist the reaction, e.g. to increase the speed of reaction.

Accordingly, step c) can be carried out without the addition of heat. Step c) may, in one embodiment, be carried out at a temperature at or below 40 degrees C., such as from 0 to 40 degrees C. or from 5 to 35 degrees C. or from 10 to 30 degrees C. or from 15 to 25 degrees C., e.g. it may be carried out at or near room temperature (about 20 degrees C.).

A heat source can optionally be introduced to accelerate polymerisation, if desired. The application of heat may also improve mechanical properties of the polymeric material formed, in some embodiments. The heat source may in one embodiment be an infra-red heat source. It will be appreciated that an infra-red heat source may provide infra-red light.

The particulate polymeric material is particles of polymeric material comprising linear polymer chains. Some or all of the linear polymeric chains have reactive functional groups available, such that they can react to form extended polymeric chains that are linear. These reactive functional groups are provided as one end group or as two end groups on the linear polymeric chains, such that the growth of the chain is linear.

Meanwhile, the reactive liquid comprises reactive units which are monomeric units and/or linear oligomeric units and/or linear polymeric units, wherein the reactive units have two or fewer reactive groups each. Some, most or all of the monomeric units and/or linear oligomeric units and/or linear polymeric units must have reactive functional groups available, such that they can react with linear polymeric chains in the particulate polymeric material to form extended polymeric chains that are linear. The reactive functional groups are provided as one end group or as two end groups, such that when there is reaction with the linear polymeric chain, the growth of the chain is linear.

Clearly, it must be the case that the reactive functional groups available on the linear polymeric chains are able to react with reactive functional groups on the reactive units in the reactive liquid.

In one embodiment, the reactive functional groups available on the linear polymeric chains are hydroxyl groups or amino groups, and the reactive units in the reactive liquid have reactive functional groups that can react with hydroxyl groups or amino groups respectively.

In one embodiment, the reactive functional groups available on the reactive units in the reactive liquid are hydroxyl groups or amino groups, and the linear polymeric chains have reactive functional groups that can react with hydroxyl groups or amino groups respectively.

Non-limiting examples of pairs of reactive functional groups that can react together are:
Hydroxyl groups with isocyanate groups
Hydroxyl groups with ester groups
Hydroxyl groups with carbonate groups
Amino groups with isocyanate groups
Amino groups with oxoacid groups, e.g. carboxylic acid groups
Amino groups with acyl halide groups, e.g. those derived from carboxylic acid groups.

In one embodiment, the pairs of reactive functional groups that can react together are:
Hydroxyl groups with isocyanate groups; or
Amino groups with isocyanate groups.

Preferably the reactive liquid comprises reactive units which are monomeric units and/or linear oligomeric units. It may optionally further comprise linear polymeric units. In one embodiment the reactive liquid comprises reactive units which are monomeric units. It may optionally further comprise linear oligomeric units and/or linear polymeric units.

Preferably two reactive functional groups are available on the reactive units (whether monomeric units and/or linear oligomeric units and/or linear polymeric units), such that the reaction does not terminate the extended polymeric chain but instead leaves a reactive functional group available for reaction. In other words, one of the reactive functional groups reacts, and the other becomes the new end group on the extended polymeric chain, with this new end group being a reactive functional group that can react to further extend the chain.

Thus linear polymer chains can react with the monomeric units and/or linear oligomeric units and/or linear polymeric units in the reactive liquid by virtue of reactive functional groups (which are end groups) of the polymeric chains reacting with reactive functional groups (which are end groups) of the monomeric units and/or oligomeric units and/or polymeric units, so as to form extended polymeric chains that are linear.

As noted above, it is preferred that there are also reactions between the monomeric units and/or oligomeric units in the liquid. Thus in one embodiment reactive functional groups of the monomeric units and/or linear oligomeric units react with reactive functional groups of other monomeric units and/or linear oligomeric units to form additional linear oligomers and/or linear polymers. It may then be that the reactive functional groups of the linear polymeric chains in the particulate polymeric material react with the reactive functional groups of these additional linear oligomers and/or these linear polymers, so as to form extended polymeric chains that are linear. Again, the reactive groups are end groups, such that the additional oligomers and/or polymers that are formed are linear.

The particulate polymeric material is polymeric material comprising linear polymeric chains, e.g. consisting essentially of linear polymeric chains or consisting only of polymeric chains. The polymeric material is synthesised from monomeric units, e.g. twenty or more monomeric units, such as fifty or more monomeric units, or 100 or more monomeric units, or 200 or more monomeric units, or 500 or more monomeric units.

The polymeric material may be a homopolymer, or it may be a copolymer.

The skilled person would appreciate that polymers are often defined in terms of a repeating unit; the repeating unit comprises one or more monomeric units, e.g. A, B. A homopolymer comprises a single repeating monomeric unit, for example it may be $(A)_n$ or $(B)_n$ where n is an integer. By contrast, a copolymer may have a repeating unit comprising multiple monomeric units, for example $(AB)_n$ or $(AABB)_n$ where n is an integer.

The reactive liquid comprises reactive units which are monomeric units and/or linear oligomeric units and/or linear polymeric units.

The linear oligomeric units are made up of two or more monomeric units. In one embodiment the oligomeric units are made up of from two to ten monomeric units, e.g. from two to eight monomeric units.

The linear polymeric units may comprise twenty or more monomeric units, such as thirty or more monomeric units or forty or more monomeric units or fifty or more monomeric units, e.g. 100 or more monomeric units.

In one preferred embodiment the particulate polymeric material provided in step a) and the shaped layer of linear polymer obtained in step c) are both formed from the same type of polymer. In other words, the extension of the linear polymeric chains that occurs in step c) does not change the chemistry of the polymer, only its number of repeating units and therefore its molecular weight. This is beneficial in that a homogeneous shaped layer of linear polymer can be formed. In turn, this enables an object to be formed that is homogeneous in nature.

In one embodiment the reactive liquid comprises monomeric units and the particulate polymeric material comprises linear polymeric chains based on at least one monomeric unit that is the same type as the monomeric units in the reactive liquid. For example, the linear polymeric chains may be $(A)_n$ where n is an integer greater than 20, and the monomeric units may be A. As another example, the linear polymeric chains may be (AB), where n is an integer greater than 20 or may be $(A)_p(B)_q$ where p+q is an integer greater than 20, and the monomeric units may be A or may be B.

In one embodiment the reactive liquid comprises linear oligomeric units (which are made up of two or more monomeric units) and the particulate polymeric material comprises linear polymeric chains based on at least one monomeric unit that is the same type as the monomeric units in the linear oligomeric units. For example, the linear polymeric chains may be $(A)_n$ where n is an integer greater than 20 and the linear oligomeric units may be $(A)_m$ where m is an integer of from 2 to 10.

In one embodiment the reactive liquid comprises linear oligomeric units (which are made up of two or more monomeric units) and the particulate polymeric material comprises linear polymeric chains based on at least one repeating unit that is the same type as the repeating units in the linear oligomeric units. For example, the linear polymeric chains may be (AB)n where n is an integer greater than 20 and the linear oligomeric units may be (AB)m where m is an integer of from 2 to 10.

In one embodiment the reactive liquid comprises linear polymeric units (which are suitably made up of fifteen or twenty or more monomeric units) and the particulate polymeric material comprises linear polymeric chains based on at least one monomeric unit that is the same type as the monomeric units in the linear polymeric units. For example, the linear polymeric chains may be (A)n where n is an integer greater than 20 and the linear polymeric units may be (A)m where m is an integer of greater than 15, e.g. greater than 20.

In one embodiment the reactive liquid comprises linear polymeric units (which are made up of fifteen or twenty or more monomeric units) and the particulate polymeric material comprises linear polymeric chains based on at least one repeating unit that is the same type as the repeating units in the linear polymeric units. For example, the linear polymeric chains may be (AB)n where n is an integer greater than 20 and the linear polymeric units may be (AB)m where m is an integer of greater than 15, e.g. greater than 20.

In alternative embodiments, the monomeric units and/or repeating units provided in the reactive liquid are different from the monomeric units and/or repeating units in the particulate polymeric material. The use of different units may allow chemical and/or physical properties of the shaped layer of linear polymer be locally varied. Thus the particulate polymeric material provided in step a) and the shaped layer of linear polymer obtained in step c) may be formed from different types of polymer.

The particulate material may comprise any suitable polymeric chains, provided that they are linear and present reactive functional groups. As noted above, the reactive groups may be presented as one or two end groups. The invention is not limited to the use of any specific polymer type in the particulate material and it may be selected dependent on the desired properties of the object to be formed.

In various embodiments, the polymers that form the linear polymeric chains are polymers that can undergo addition polymerization or condensation polymerization to form linear polymers.

In one embodiment the linear polymeric chains in the particulate material are selected from polyurethane, polyurea, polycarbonate, polyamide, polyester, polyether and combinations thereof.

In one embodiment the linear polymeric chains in the particulate material are selected from polyurethane, polyurea, polycarbonate, polyamide, and combinations thereof.

In one embodiment the linear polymeric chains in the particulate material are selected from polyurethane, polyurea, polyamide, polyester, and combinations thereof.

In one embodiment the linear polymeric chains in the particulate material are selected from polyurethane, polyurea and combinations thereof.

Some examples of suitable combinations of particulate polymer material and reactive liquid components are listed below:

| Final Product | Particulate material | Reactive Liquid |
|---|---|---|
| Polyurethane | Polyurethane powder with hydroxyl end groups | Di-isocyanate based reactive liquid |
| Polyurea | Polyurea powder with amino end groups | Di-isocyanate based reactive liquid |
| Polyesters | Polyester powder with hydroxyl end groups | Di-ester based reactive liquid |
| Polyamides | Polyamide powder with amino end groups | Di-acid based reactive liquid or di(acyl halide) based reactive liquid |
| Polycarbonates | Polycarbonate powder with hydroxyl end groups | Carbonate based reactive liquid |

It will be appreciated that the available reactive groups for the linear polymeric chains are of particular importance. Having an end group (or two end groups) that are available to react is necessary for the method to be effected. This reactive end group of the linear polymeric chain reacts with a reactive group on the monomeric unit and/or oligomeric unit and/or polymeric unit from the reactive liquid.

The polymers in the particulate material may have any suitable molecular weight. In one embodiment the weight average molecular weight is from 2,000 to 1,000,000 Da, e.g. from 2,000 to 50,000 Da, such as from 3,000 to 25,000 Da, and preferably from 3,000 to 10,000 Da, e.g. from 3,500 to 9,000 Da, and more preferably from 4,000 to 8,000Da. Molecular weight can be measured using gel permeation chromatography (GPC).

The skilled person would understand that the molecular weight in the starting materials used and in the resultant polymeric layers can be chosen based on desired mechanical properties. Generally, the higher the molecular weight, the better the mechanical properties, but there may be a loss in flexibility, for example.

The particulate material may have particles with any suitable size. In one embodiment the particles have an average (mean) diameter of from >0 micron to 500 microns, for example from 0.01 microns to 200 microns or from 0.05 microns to 150 microns or from 0.1 microns to 100 microns.

The particle size can be measured by laser diffraction. The skilled person will understand that, the finer the particles, the thinner the layers of shaped linear polymer that can be built up. A smaller particle size may therefore provide greater processing resolution.

In one embodiment, 90 wt % or more of the particles in the layer of particulate material as provided in step a) are in the size range of up to 200 microns, e.g. up to 150 microns or up to 100 microns. In one embodiment, 95 wt % or more of the particles in the layer of particulate material as provided in step a) are in the size range of from up to 250 microns, e.g. up to 150 microns or up to 100 microns. In one embodiment, 100 wt % of the particles in the layer of particulate material as provided in step a) are in the size range of up to 250 microns, e.g. up to 150 microns or up to 100 microns. Sieving can be used to determine particle size distribution.

In some embodiments, the penetration depth of the reactive liquid into the particulate polymeric material has been determined to be between 100 µm and 200 µm. The maximum thickness of a layer of the particulate material to be used is therefore preferably 200 µm or less, more preferably 150 µm or less and most preferably 100 µm or less when a homogeneous material is desired. This puts an upper limit on particulate size.

It will be appreciated that there is no limit on the number of particles to be provided in the layer formed in step a). The quantity of particles is determined by the size of the object being formed by the 3D printing method. Enough material must be provided to be able to form a shaped layer that in turn forms at least part of the desired object.

In one embodiment polymer particles may be prepared through polyaddition polymerization. For example, reaction of diisocyanate with diols or with diamines may be carried out in organic solvent solution with the optional presence of a catalyst. This technique may be used to prepare a powder with a molecular weight of about 4000 Da, although other MWs are of course achievable. The prepared powder can then be sieved to obtain a desired particle size distribution, e.g. it can be sieved with a 150 µm mesh sieve to obtain polymer powder with particles smaller than 150 µm.

The reactive liquid may comprise any suitable monomeric units and/or linear oligomeric units and/or linear polymeric units. The invention is not limited to the use of any specific monomeric units, oligomeric units or polymeric units in the reactive liquid, provided that these can react with the chosen polymeric particulate material to form extended polymeric chains that are linear, rather than branched or cross linked.

It will be appreciated that the available reactive groups for the monomeric units and/or linear oligomeric units and/or linear polymeric units is important. Having an end group (or two end groups) that are available to react is necessary for the method to be effected. This reactive end group of the monomeric units and/or linear oligomeric units and/or linear polymeric units reacts with a reactive group on the linear polymeric chain.

In this regard, the skilled person will appreciate that the reactive liquid constituents and the polymeric particulate material are chosen so as to allow bonding between reactive functional groups in the reactive liquid and the reactive functional groups in the linear polymer chains in the polymeric material. Materials for which polymerisation proceeds via free radical polymerisation are therefore to be avoided.

In one embodiment the monomeric units are selected from alcohols, amines, isocyanates, carboxylic acids, acyl halides, anhydrides, chloroformates, and combinations thereof.

In one embodiment the monomeric units are selected from alcohols, amines, isocyanates, carboxylic acids, acyl halides, and combinations thereof.

In one embodiment the monomeric units are selected from alcohols, amines, isocyanates, and combinations thereof.

In one embodiment the oligomeric units are selected from polyurethanes, polyureas polycarbonates, polyamides, polyesters, polyethers, and combinations thereof.

In one embodiment the oligomeric units are selected from polyurethanes, polyureas, polyamides, polyesters, and combinations thereof.

In one embodiment the oligomeric units are selected from polyurethanes, polyureas and combinations thereof.

The oligomers may be in solid form or in liquid form. Preferably they are in liquid form.

The oligomers may have any suitable molecular weight. In one embodiment the weight average molecular weight is from 200 to 1000 Da. A higher molecular weight polymer in the solid state may be used in some embodiments to increase the viscosity of the reactive liquid.

In one embodiment the reactive liquid comprises reactive units that are monomeric units and/or oligomeric units.

The skilled person would understand that careful control of viscosity facilitates printing, and that a higher molecular weight generally increases viscosity. Therefore the viscosity of the reactive liquid may be controlled. Some polymer units may therefore be mixed in with oligomeric units and/or monomeric units to increase the viscosity.

The skilled person will appreciate that the desired viscosities may be impacted by the nature of the printing arrangements.

It is preferable that in the reactive liquid the monomeric units and/or oligomeric units and/or polymeric units each have precisely two reactive functional groups available; the inclusion of more than two reactive functional groups could lead to crosslinking occurring (so reducing control of polymer growth), whilst polymerisation will be terminated if only a single reactive functional group is present.

In one embodiment, the polymeric chains include a first reactive functional group, and the reactive liquid includes monomeric units and/or oligomeric units and/or polymeric units which have a second reactive functional group, wherein the first reactive functional group can react with the second reactive functional group.

As noted above, preferably the monomeric units and/or oligomeric units and/or polymeric units are di-functional, i.e. they have exactly two reactive functional groups. In one embodiment these two reactive functional groups are the same. Therefore after the linear polymeric chains in the layer of polymeric material have been allowed to react with the monomeric units and/or linear oligomeric units and/or linear polymeric units in the reactive liquid, the extended polymeric chains that are linear have a reactive functional group available which is the second reactive functional group.

Optionally, therefore, a further reactive liquid is provided in addition to the original reactive liquid. This is applied as part of step c), after the linear polymeric chains in the layer of polymeric material have been allowed to react with the monomeric units and/or linear oligomeric units and/or linear polymeric units in the reactive liquid so as to form extended polymeric chains that are linear. In this regard, said further reactive liquid includes monomeric units and/or linear oligomeric units and/or linear polymeric units, which have third reactive functional groups. These third reactive functional groups can react with the second reactive functional group that is available on the linear extended polymeric chains. In addition, or alternatively, if there is any unreacted original reactive liquid the third reactive groups can react with second reactive groups from that unreacted original reactive liquid.

Therefore the use of the further reactive liquid can help to bond particles of polymeric material together and form a strong polymeric layer.

Preferably, the monomeric units and/or linear oligomeric units and/or linear polymeric units in the further reactive liquid are di-functional, i.e. they have exactly two reactive functional groups. In one embodiment these two reactive functional groups are the same. Therefore after the extended linear polymeric chains have been allowed to react with the monomeric units and/or linear oligomeric units and/or linear polymeric units in the further reactive liquid, the reacted extended polymeric chains have a reactive functional group available which is the third reactive functional group.

In one embodiment, the first reactive functional groups are the same as the third reactive functional groups. In other words, the further reactive liquid can effectively serve to "regenerate" the first reactive functional group on the extended linear polymer.

For embodiments where two reactive liquids are used, some examples of suitable combinations of particulate polymer material and reactive liquid components are listed below:

| Final Product | Particulate material | Reactive Liquid(s) |
| --- | --- | --- |
| Polyurethane | Polyurethane powder with hydroxyl end groups | 1) Di-isocyanate based reactive liquid 2) Diol based reactive liquid |
| Polyurea | Polyurea powder with amino end groups | 1) Di-isocyanate based reactive liquid 2) Amine based reactive liquid |
| Polyesters | Polyester powder with hydroxyl end groups | 1) Di-ester based reactive liquid 2) Diol based reactive liquid |
| Polyamides | Polyamide powder with amino end groups | 1) Di-acid based reactive liquid or di(acyl halide) based reactive liquid 2) Di-amine based reactive liquid |

-continued

| Final Product | Particulate material | Reactive Liquid(s) |
| --- | --- | --- |
| Polycarbonates | Polycarbonate powder with hydroxyl end groups | 1) Carbonate based reactive liquid 2) Diol based reactive liquid |

In one embodiment, the reactive liquid may comprise just monomeric units, or just oligomeric units. In one embodiment, the reactive liquid may comprise a mixture of monomeric units and oligomeric units.

In one embodiment, the reactive liquid may comprise monomeric units and further comprise polymeric units. In one embodiment, the reactive liquid may comprise oligomeric units and further comprise polymeric units. In one embodiment, the reactive liquid may comprise monomeric units and oligomeric units and further comprise polymeric units.

The reactive liquid may be a suspension of said monomeric and/or oligomeric and/or polymeric units in a carrier. The carrier may be aqueous, e.g. water, or non-aqueous, e.g. an organic solvent.

Alternatively, the reactive liquid may have no carrier. Thus it may substantially consist of monomeric units in liquid form and/or oligomeric units in liquid form and/or polymeric units in liquid form. Advantageously, when there is no carrier, there is no risk of said carrier remaining trapped within the 3D printed object and preventing continuity of the polymeric material formed.

Thus in one embodiment the reactive liquid consists essentially of, or consists entirely of, monomeric units in liquid form and/or oligomeric units in liquid form and/or polymeric units in liquid form.

A catalyst may be used to promote the reaction in step c). Alternatively, no catalyst may be provided.

The particulate material and/or the reactive liquid may include a catalyst to promote the reaction in step c). For example, a catalyst may be mixed with the particulate material and/or a catalyst may be provided on top of the particulate material. The reactive liquid may comprise a catalyst and/or a catalyst may be added to the reactive liquid. A catalyst may be added separately. A catalyst may be added after the selective deposition of the reactive liquid onto the layer of particulate polymeric material.

A catalyst may be provided in step a) and/or step b) and/or step c).

A polymerisation initiator and/or a polymerisation accelerator may be used.

The reactive liquid may contain a polymerisation initiator and/or a polymerisation accelerator. Additionally or alternatively, the particulate material may contain a polymerisation initiator and/or a polymerisation accelerator. Additionally or alternatively, a polymerisation initiator and/or a polymerisation accelerator may be added after the selective deposition of the reactive liquid onto the layer of particulate polymeric material.

In some embodiments, no polymerisation initiator or polymerisation accelerator is provided.

The catalyst used may be any known polymerisation catalyst. The skilled person will appreciate that the choice of catalyst will depend upon the type of polymer involved in the method. If a catalyst is to be used in the present invention, it can be selected from known catalysts in the art for the polymerisation reaction in question.

In one embodiment, the catalyst is an organotin compound such as stannous octoate (SnOct), 1,4-diazabicyclo[2,2,2]-octane (DABCO) or dibutyltin dilaurate (DBTDL). Dibutyltin dilaurate (DBTDL) in particular is a useful catalyst when the polymer is a polyurethane or polyurea.

When a catalyst is used, stability should be taken into account when deciding whether it should be provided together with the particulate material or with the reactive liquid or added separately. The skilled person will appreciate that it is preferable to provide the catalyst in the environment in which it is most stable. In one embodiment, the catalyst is provided in the reactive liquid.

In one specific embodiment using two reactive liquids, the first reactive liquid is an isocyanate-based liquid prepared with the isocyanate monomer, hexamethylene diisocyanate. However, the viscosity of this fluid is too low to be used on inkjet cartridges. A commercial viscous poly(hexamethylene diisociante) can therefore be added to increase the viscosity. A suitable ratio of monomer: polymer may be from 50:50 to 80:20 w/w, e.g. from 55:45 to 70:30, such as from 60:40 to 65:35 w/w.

Dibutyltin dialurate may optionally be included as a catalyst (e.g. at a level of about 0.1 to 5% w/w, such as from 1 to 3% w/w). Other catalysts known for use in polyurethane formation could be used, however, e.g. other organotin catalysts, at the same exemplary levels.

The second reactive liquid is a diol, such as butane-1,4-diol. This may be used in pure commercial form.

In this specific embodiment, the particulate material is preferably polyurethane, and the object formed is then formed from polyurethane, because the reaction with the reactive liquids will serve to form polyurethane with higher molecular weight.

A modification of this specific embodiment would be to use a di-amine as the second reactive liquid. The particulate material is then preferably polyurea, and the object formed is then formed from polyurea, because the reaction with the reactive liquids will serve to form polyurea with higher molecular weight.

Traditional binder jetting techniques effectively join particulates together with glue and thus the technique can be seen as an adhesion technique. As the skilled person will appreciate, adhesion of one material to another is not the same as reacting two materials together. The present invention offers uniform material properties because the monomers or oligomers in the reactive liquid chemically react with the polymeric chains in the particulate material, to form extended polymeric chains that are linear. These are extended due to the polymer backbone being made longer. The monomeric units or oligomeric units together with the particulate material therefore chemically become a part of one single polymer. There is a new polymer formed by the reaction. This contrasts with the situation in prior techniques where the original polymer remains, and there is a separate and different material that is physically attached to the original polymer.

Improved and more easily tailored material properties can be obtained by use of the present invention, for example by varying the composition of the reactive liquid.

In particular, the monomeric units or oligomeric units can be selected to include monomers that are the same as monomers present in the polymer chains of the particulates. This can lead to greater homogeneity and improved physical and chemical properties.

The monomeric units or oligomeric units can be selected to include reactive functional groups that will react with reactive functional groups on the polymer chains of the particulates to form new linking groups that are the same as groups already present in the polymer chains of the particulates. This can lead to greater homogeneity and improved physical and chemical properties.

There is also greater homogeneity as compared to products formed by Selective Laser Sintering (SLS) or related techniques that use an infrared heat source instead of a laser. These are physical processes which use a laser/infrared heat source to melt the outer shell of polymeric powder and so sinter the particles together. The resulting product will show a different thermal history for the sintered part (outer shell) and non-sintered part (inner core). For the present invention, because a chemical reaction is used to bond the particles together, they do not have this split in characteristics between the outer shell and inner core. Therefore they can be distinguished by techniques such as Scanning Electron Microscope (SEM), Differential Scanning Calorimetry (DSC), and Gel Permeation Chromatography (GPC).

Meanwhile, it is also possible to obtain greater homogeneity as compared to products formed by binder jetting. That process is based on using binders to combine powdered polymeric material, and therefore inevitably there is a binder which is chemically distinct from the polymer. The present invention in preferred embodiments uses reactive liquids that contain monomeric units and/or oligomeric units based on the same monomer type/repeating unit type/linking group type as the polymer used in the particulate polymeric material, and therefore the resulting polymer is of the same type. In other words, the present invention permits objects to be made where the object is formed from the same polymer as the starting particulate polymeric material, just with the polymer having a higher molecular weight/greater number of repeating units. There is no need to introduce any material into the object that has a different chemistry, such as a binder.

Additionally, as the polymeric chains in the particulate material are fused together by the monomeric units and/or oligomeric units and/or polymer units from the liquid, the objects formed by the method of the present invention may have a smoother surface finish.

In addition, the objects formed may present better mechanical performance than equivalents made by traditional binder jetting techniques, due to the reduced porosity; for example being harder. Lower porosity than many prior art additive manufacturing products is provided, because the reactive liquid fills the voids between polymeric particles and then reacts with the polymeric chains therein so as to form a single polymeric layer.

Further, mechanical properties can be varied within a single manufactured object by using different reactive liquids in different layers of the object.

As compared to additive manufacturing techniques involving sintering, a thermoplastic material formed by the present method can have lower porosity. This is because instead of the edges of the particles being joined by surface melting, leaving pores between the joins and creating a rough surface finish, the reactive liquid can more completely fill the spaces between the particles, so allowing a continuous layer of polymeric material to be formed in step c).

In addition, energy and apparatus usage can also be reduced. In terms of energy usage, a typical temperature for sintering is around 190° C., whereas the processing temperature for the present invention is between room temperature and 60° C., e.g. from 20 to 40° C., for the embodiments being described.

Further, the technique disclosed herein is not limited to producing dark coloured items.

Further, as heating is not required, control can be significantly improved as compared to powder bed fusion techniques. The skilled person would understand that surface melting requires even heating across the layer being fabricated and also time for heat transfer and thermal equilibration (which can slow down printing processes). Precise control is therefore difficult to obtain; for example, regions of the object to be fabricated closer to a heater are likely to be melted more than more distant regions, so leading to non-uniform properties.

Use of a heat source may help to accelerate polymerisation and/or improve mechanical properties; however it is not essential (i.e. the reaction can be at or near room temperature) and furthermore when heat is used the temperatures reached do not need to be very high. For example, a temperature of 30-60° C., such as 40-60° C. may be sufficient, as compared to sintering temperatures used in other additive manufacturing techniques, which are often around 190° C. Curing can require a temperature up to 80° C.

Warping of relatively large and supposedly flat regions can be another problem associated with heat-curing. Using a laser is time-consuming as each point has to be focused upon, voxel by voxel. Heat (or energy) curing can be used to cure large volumes simultaneously, but has the control issues discussed above and also uses significant energy.

Production control and speed are therefore improved by the present invention, as compared to prior art sintering-type techniques, as well as surface properties. Energy efficiency may also be improved.

As compared to additive manufacturing techniques involving lasers, the technique disclosed herein can use less energy and also less expensive apparatus. In addition, by controlling the composition of the reactive liquid, the mechanical properties (e.g. strength, flexibility) can be varied within a single manufactured item.

As compared to material jetting or extrusion, the method of the invention avoids the need to melt or dissolve the polymer to be 3D printed, and, in at least some implementations, may allow improved tailoring and modification of properties in different portions of a 3D object. Resolution can therefore be improved.

In addition, printing speed is increased, so allowing more or larger objects to be produced more quickly and making the technique more economically viable for mass production.

As compared to vat photopolymerisation, the present invention avoids the need for light (e.g. UV) for curing, so reducing equipment costs and energy usage.

The technique disclosed herein can produce objects which are more durable, and at a higher manufacturing speed, than those produced by vat photopolymerisation.

In addition, the range of suitable materials is increased from only encompassing acrylate or epoxy to any polymers that can be synthesised by step-growth polymerisation.

Sheet lamination techniques are not suitable for use with some materials and require energy input (e.g. ultrasound, heat) to join the layers. Further, the resultant object can have an undesired layered structure if the melding of layers is not complete.

In the present invention, selective deposition of the liquid in step b) may be performed by printing, jetting or dropping the liquid onto the polymer particles in a shape or pattern.

The method of the first aspect of the invention can be performed without a mould or other support structure. For example, the particulate polymeric material can be arranged in a layer (for example contained in a bed) and the liquid selectively deposited to one or more sub-regions of the layer. Excess particles which do not react with the monomeric units and/or oligomeric units and/or polymeric units can be removed from the formed object once complete, or between applications of successive layers as appropriate.

The method may comprise:
a) providing a layer of polymeric material, said polymeric material being in particulate form, and comprising linear polymer chains, Advantageously, and unlike cross-linking polymerisation, linear polymerisation retains the thermoplastic properties of a thermoplastic particulate polymeric material when it is further polymerised to form the bulk material of the fabricated object.

Linear polymerisation extends the length of individual polymer chains. In the case of a linear polymeric chain as starting material, as in the present invention, this occurs, by increasing the length of the polymer backbone. The final product of such a linear polymerisation is therefore a linear polymer with a higher molecular weight.

Linear polymerisation is distinct from cross-linking as it does not involve joining together individual polymer chains in multiple places and thus creating a web of interlinked chains (cross-linking).

There are two basic types of polymerisation mechanism; chain-growth (or addition) and step-growth (or condensation) polymerisation. These mechanisms are contrasted in the Table below.

| Step-growth polymerisation | Chain-growth polymerisation |
| --- | --- |
| Rapid loss of monomers early in the reaction | Some monomers remain even after long reaction times |
| Similar steps repeated throughout the reaction process | Different steps operate at different stages of the reaction process (i.e. initiation, propagation, termination, and chain transfer) |
| Average molecular weight increases slowly at low conversion and high extents of reaction are required to obtain high chain length | Molar mass of backbone chain increases rapidly at early stage and remains approximately the same throughout the polymerization |
| Ends remain active (no termination) | Chains not active after termination |
| No initiator necessary | Initiator required (e.g. heat and catalyst) | b) selectively depositing a reactive liquid onto the layer of particulate polymeric material, in a pattern corresponding to a cross-section of the object to be fabricated, said reactive liquid comprising reactive units which are monomeric units, linear oligomeric units, linear polymeric units, or combinations thereof, wherein said reactive units have two or fewer reactive groups,
c) allowing linear polymeric chains in said layer of polymeric material to react with reactive units in said reactive liquid so as to form extended polymeric chains that are linear, so as to provide a shaped layer of linear polymer, and
d) repeating steps a) to c) as required to form the object from successive shaped layers of linear polymer.

The particulate linear polymeric material may be a thermoplastic polymeric material. In such embodiments, the final product may also be a thermoplastic polymer.

The skilled person would understand that applying the reactive liquid to the particulate polymeric material in a pattern corresponding to a cross-section of the object to be fabricated is an example of selective deposition. For an object being made from a single layer of material, i.e. where the repetition of steps a) to c) is not required, selective deposition means applying the liquid to the particulate polymeric material in a pattern corresponding to the shape of the object to be fabricated.

The reactive liquid and the particulate polymeric material may undergo linear polymerisation when in contact at room temperature and pressure. Linear polymerisation is a significant benefit to the material properties achieved. For example, linear polymers can be more easily recycled than cross-linked polymers.

Preferably, the method of the first aspect of the invention entails step-growth polymerisation. Advantageously, no initiator is required.

The relatively slow (un-catalysed) increase in molecular weight may facilitate material property tailoring.

In some embodiments a catalyst may be used to accelerate step-growth polymerisation.

Porosities of between 0% and 9% have been obtained in trials of the invention. The person skilled in the art will appreciate that the method of the present invention is capable of reducing porosity as the reactive liquid can penetrate into gaps between the particles to fill the gaps. This can be contrasted with SLS where filling these gaps is more difficult, because the melted polymer used has much higher viscosity than reactive liquid of the present invention.

Porosity is determined by a range of factors but normally the porosity is between 0 and 20%. Porosity can be determined by gas adsorption analysis, e.g. using nitrogen at 77K. The BET technique may be used.

The particulate polymeric material may comprise at least one of the following polymer types: (i) polyurea; (ii) polyurethane;(iii) polycarbonate; (iv) polyamide; (v) polyester; and (vi) polyether.

In one embodiment the particulate polymeric material may comprise at least one of the following polymer types: (i) polyurea; (ii) polyurethane; (iii) polycarbonate; and (iv) polyamide.

In one embodiment the particulate polymeric material may comprise at least one of the following polymer types: (i) polyurea; and (ii) polyurethane.

Advantageously, the additive manufacturing method disclosed herein allows a wider range of polymers to be fabricated by binder jetting-type techniques than the prior art systems, including many engineering polymers which are widely used in industry.

In particular, it is notable that binder jetting techniques do not use polyurea or polyurethane.

In one embodiment, the particulate polymeric material may comprise, or may consist essentially of, or may consist solely of, polyurea.

In one embodiment, the particulate polymeric material may comprise, or may consist essentially of, or may consist solely of, polyurethane.

Prior art binder jetting techniques are generally limited to acrylates and related materials due to the chemistry required for photo-curing (e.g. UV curing) or thermal curing, and cannot be applied to polyurethane.

Polyurethane is widely used in many fields of industry due to its useful and tailorable physical and chemical properties. The ability to use polyurethane, and to produce polyurethane objects by additive manufacturing, is therefore advantageous.

In particular, as there is no curing involved, radiation is not needed. Materials which are transparent, or substantially transparent, to radiation can therefore be used. Therefore, objects which are transparent and/or have a light colour can be produced.

According to a second aspect of the invention, there is provided a kit of parts for use in fabricating an object by additive manufacturing. The kit of parts comprises:
  polymeric material, said polymeric material being in particulate form, and comprising linear polymer chains, reactive liquid comprising reactive units which are monomeric units, linear oligomeric units, linear polymeric units, or combinations thereof, wherein said reactive units have two or fewer reactive groups, wherein linear polymeric chains in said layer of polymeric material are able to react with reactive units in said reactive liquid so as to form extended polymeric chains that are linear, so as to provide a shaped layer of linear polymer.

The particulate polymeric material may be thermoplastic.

Optionally, the kit of parts further comprises a catalyst. In one embodiment the catalyst is provided with the polymeric material. In another embodiment the catalyst is provided with the reactive liquid. The catalyst may be as described in respect of the first aspect of the invention.

Optionally, the particulate polymeric material is provided in a container or in two or more containers. The container(s) may be suitable for insertion into a user's additive manufacturing apparatus, or arranged to facilitate transfer of the particulate polymeric material into the apparatus.

Optionally, the reactive liquid is provided in a container suitable for insertion into a user's additive manufacturing apparatus, for example it may be provided in a cartridge or reservoir.

The particulate polymeric material may have any of the properties described with respect to the first aspect of the invention.

The reactive liquid may have any of the properties described with respect to the first aspect of the invention.

Thus the particulate polymeric material and the reactive liquid are preferably both as defined above with respect to the first aspect of the invention.

According to a third aspect of the invention, there is provided an apparatus for fabricating an object by additive manufacturing. The apparatus comprises:
  a bed arranged to contain polymeric material, said polymeric material being in particulate form, and comprising linear polymer chains;
  a liquid supply arranged to contain a reactive liquid comprising reactive units which are monomeric units, linear oligomeric units, linear polymeric units, or combinations thereof, wherein said reactive units have two or fewer reactive groups;
  a powder supply arranged to provide the particulate polymeric material to the bed; and
  printing architecture arranged to selectively deposit the reactive liquid onto the particulate polymeric material, wherein linear polymeric chains in said layer of polymeric material are able to react with reactive units in said reactive liquid so as to form extended polymeric chains that are linear, so as to provide a shaped layer of linear polymer.

The particulate polymeric material may be thermoplastic.

Preferably, the shaped layer linear polymer is a thermoplastic polymer.

Preferably, the apparatus does not have a laser or UV light.

A heater may be provided in some embodiments, but is not essential.

Preferably, the apparatus includes the particulate polymeric material held in the powder supply and the reactive liquid held in the liquid supply.

The liquid supply may be a cartridge, reservoir, pipeline, or the like.

Advantageously, as photo-curing is not used in the method of the first aspect of the invention, the printing apparatus (i.e. the apparatus for additive manufacturing) can be made more cheaply than those used for prior art techniques, as certain components can be eliminated. The apparatus may suitably lack a curing light source, such as a UV or infra-red light source.

According to a fourth aspect of the invention, there is provided an apparatus for fabricating an object by additive manufacturing. The apparatus comprises:
  a bed arranged to contain polymeric material, said polymeric material being in particulate form, and comprising linear polymer chains;
  a powder supply containing the particulate polymeric material and arranged to provide the particulate polymeric material to the bed;
  a liquid supply containing reactive liquid comprising reactive units which are monomeric units, linear oligomeric units, linear polymeric units, or combinations thereof, wherein said reactive units have two or fewer reactive groups; and
  printing architecture arranged to selectively deposit reactive liquid onto the particulate polymeric material, wherein linear polymeric chains in said layer of polymeric material are able to react with reactive units in said reactive liquid so as to form extended polymeric chains that are linear, so as to provide a shaped layer of linear polymer.

The particulate polymeric material may be thermoplastic.

Preferably, the shaped layer linear polymer is a thermoplastic polymer.

Advantageously, 3D printers/additive manufacturing systems already available for prior art techniques can be modified to perform the method disclosed herein. Although lasers and the like integral to some such prior art systems are not needed for the method of the first aspect of the invention, these can simply not be used.

The skilled person would understand that heaters may be used to speed up the polymerisation method described herein, but are not necessary.

The apparatus of the third or fourth aspect of the invention may comprise one or more additional reactive liquid supplies, each containing a reactive liquid which can react with the particulate polymeric material so as to form a linear polymer with one or more properties different from that of the linear polymer formed by reacting the particulate polymeric material with the reactive liquid in the first liquid supply. Graded materials may therefore be made, with varying material properties within a single object. The same apparatus can therefore also be used to fabricate different objects from different materials.

The apparatus of the third or fourth aspect of the invention may comprise one or more processors arranged to control at least one of:
- the printing architecture, such that the shape or pattern in which the liquid is deposited is controlled;
- the powder supply, such that the thickness and/or area of a deposited layer of powder is controlled, and/or to select the type of powder to be used; and
- the liquid supply, such that the rate of flow of reactive liquid, and/or the selection of the reactive liquid, is controlled.

Advantageously, material properties can therefore be varied between 3D objects, or between different portions of a single 3D object, without any liquid or powder removal and replacement, disassembly or reassembly being required. Instead, the apparatus can be controlled so as to select which already-loaded reactive liquid or polymer powder to use.

According to a fifth aspect of the invention, there is provided a method of using an additive manufacturing machine that has printing architecture, an energy source arranged to cure an object being fabricated, a powder supply and a liquid supply, the method comprising:
- putting polymeric material, said polymeric material being in particulate form, and comprising linear polymer chains, into the powder supply;
- putting reactive liquid comprising reactive units which are monomeric units, linear oligomeric units, linear polymeric units, or combinations thereof, wherein said reactive units have two or fewer reactive groups, into the liquid supply; and
- causing the printing architecture to selectively deposit the reactive liquid on the particulate polymeric material to form a linear polymer by reaction between the reactive liquid and the polymeric material,
- without using the energy source, wherein linear polymeric chains in said layer of polymeric material are able to react with reactive units in said reactive liquid so as to form extended polymeric chains that are linear, so as to provide a shaped layer of linear polymer.

The particulate polymeric material may be thermoplastic.

Preferably, the shaped layer linear polymer is a thermoplastic polymer.

According to a sixth aspect of the invention, there is provided a computer-readable medium containing instructions for fabricating an object by additive manufacturing which, when read by a processor, cause that processor to implement a method comprising:
a) providing a layer of polymeric material, said polymeric material being in particulate form, and comprising linear polymer chains,
b) selectively depositing a reactive liquid comprising reactive units which are monomeric units, linear oligomeric units, linear polymeric units, or combinations thereof, wherein said reactive units have two or fewer reactive groups,
c) allowing linear polymeric chains in said layer of polymeric material to react with reactive units in said reactive liquid so as to form extended polymeric chains that are linear, so as to provide a shaped layer of linear polymer.

The particulate polymeric material may be thermoplastic.

Preferably, the shaped layer linear polymer is a thermoplastic polymer.

The method may further include repeating steps a) to c) to form successive layers of the object.

Features described in relation to one of the above aspects of the invention may be applied, mutatis mutandis, to the other aspect of the invention. Further, the features described may be applied to the or each aspect in any combination.

BRIEF DESCRIPTION OF THE DRAWINGS

There now follows, by way of example only, a detailed description of embodiments of the present invention with reference to the accompanying drawings in which.

In the drawings, like reference numerals are used to reference like components.

DETAILED DESCRIPTION

The present invention involves the use of polymeric material in particulate form 100 and at least one reactive liquid 200.

Each particle 100 is made of a linear polymer. The particles 100 comprise linear polymers, but not cross-linked polymers or branched polymers.

Figure 1:
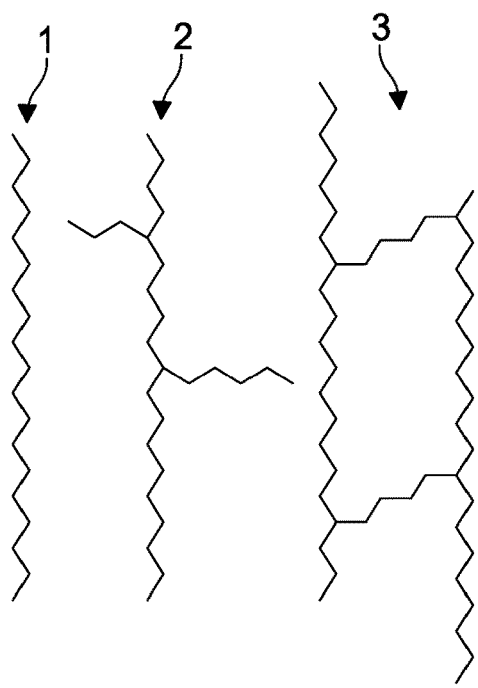
FIG. 1 (PRIOR ART) shows a schematic representation of linear, branched and cross-linked polymers.
Figure 2:
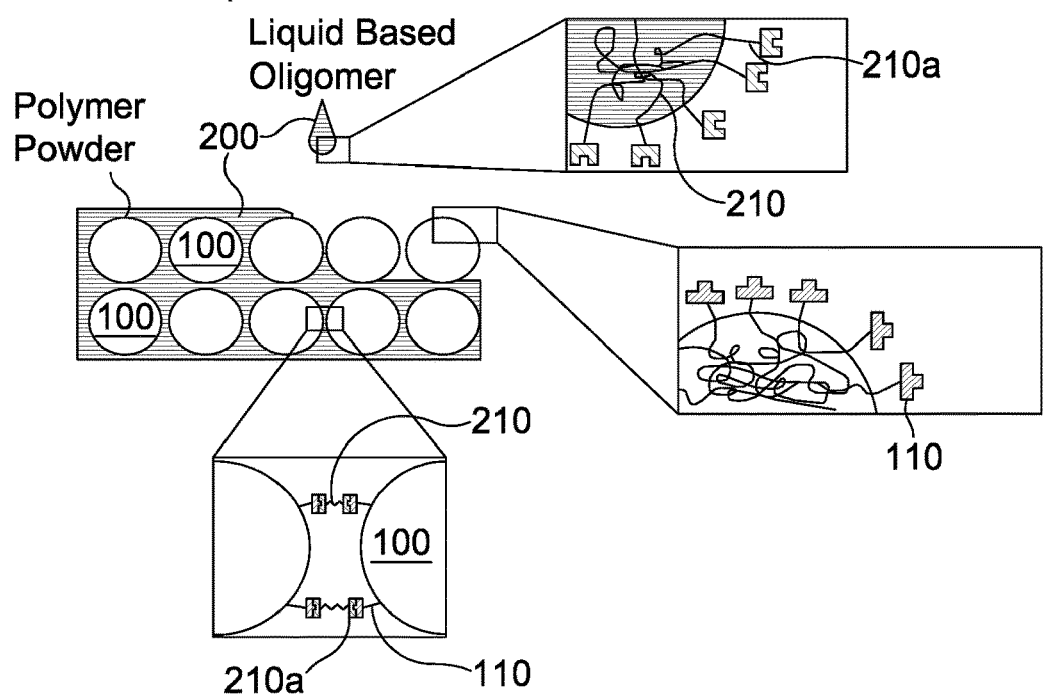
FIG. 2 shows a schematic representation of a liquid and a particulate polymeric material for use in the method disclosed herein.

The reactive liquid 200 comprises monomers 210, the monomers having two functional groups 210a per molecule (only one shown per monomer in FIG. 2 for clarity).

In alternative or additional embodiments, the liquid 200 may comprise oligomers and/or polymeric units as well as, or instead of, monomers.

In the embodiment being described the reactive liquid 200 is liquid A which is 1,6-hexamethylene diisocyanate and its oligomers. The functional groups present in the reactive liquid are therefore isocyanate groups (—NCO). Other diisocyanate monomers could be used.

In an optional embodiment there is also a second reactive liquid:- liquid B. The liquid B is 1,4-butanediol. The functional groups present in the second reactive liquid are therefore hydroxyl (—OH) groups. Other diols could be used.

In the event that a polyurea was being prepared, a di-amine would be used instead.

In the embodiment being described, a catalyst is provided. In this regard, the catalyst was present in the liquid A and additionally the catalyst was provided with the layer of particulate polymeric material. In the embodiment being described, dibutyltin dilaurate is used as the catalyst. Other catalysts could be used.

Figure 5:
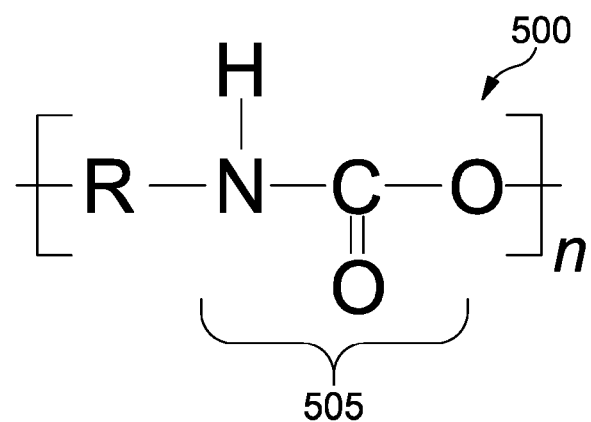
FIG. 5 (PRIOR ART) shows the chemical formula for polyurethane.

In the embodiment being described, the polymeric material 100 is polyurethane. Polyurethanes 500 form a family of polymers which are different from most other plastics in that their name does not derive from the monomeric units used; there is no specific urethane monomer. With reference to FIG. 5, instead, polyurethanes are defined with reference to the linkage present —the "urethane linkage" 505. A polyurethane is any polymer containing the urethane linkage in its backbone chain. This linkage 505 can be defined by the chemical formula NH(CO)O.

The particulate polymeric material 100 comprises one or more particles, each particle comprising linear polymeric chains having functional groups 110. In the embodiment being described, the functional groups are hydroxyl (—OH) groups.

In the event that a polyurea was being prepared, the hydroxyl groups would be replaced by amine groups (—NH$_2$).

When the reactive liquid 200 (Liquid A) is applied to the particulate polymeric material 100, a reaction occurs between the polymer chains in the particles and the monomeric units and/or oligomeric units in the reactive liquid. This leads to extended linear polymeric chains being formed.

In the embodiment being described, the particulate polymeric material 100 reacts with the liquid 200 to form a thermoplastic polymer, i.e. a polymer that softens and melts on heating, so it can be reformed.

In the embodiment described above with two reactive liquids, the particulate polymeric material 100 reacts with the liquid A 200. Liquid B contains additional functional groups 110. These can react with any residual Liquid A. These can bond particles of polymeric material 100 together.

Thus functional groups 110 in the particles 100 react with a corresponding one or more functional groups 210a of the reactive liquid 200. The reactions extend the chain length of the polymer forming the particles 100. Monomers 210 and/or oligomers in the reactive liquid 200 may also react with each other to form longer chains.

In the embodiment being described, the polymer formed is polyurethane. However, the invention is not limited to polyurethane and polyurea and other polymers noted above can also be used.

The skilled person would understand that, given the range of polymers encompassed by the term polyurethane, a wide range of material properties can be obtained depending on the nature of the groups in the particulate polymeric material 100 and/or in the liquid 200.

Graded material properties can be obtained in the object being formed by, for example, changing the composition of the reactive liquid 200 gradually, with changes being made after one or more layers of the object have been formed.

In alternative embodiments, different particulate polymeric materials 100 and/or different reactive liquids 200 may be used. Different polymers may therefore be formed. These are discussed in more detail in the description above.

Figure 3:
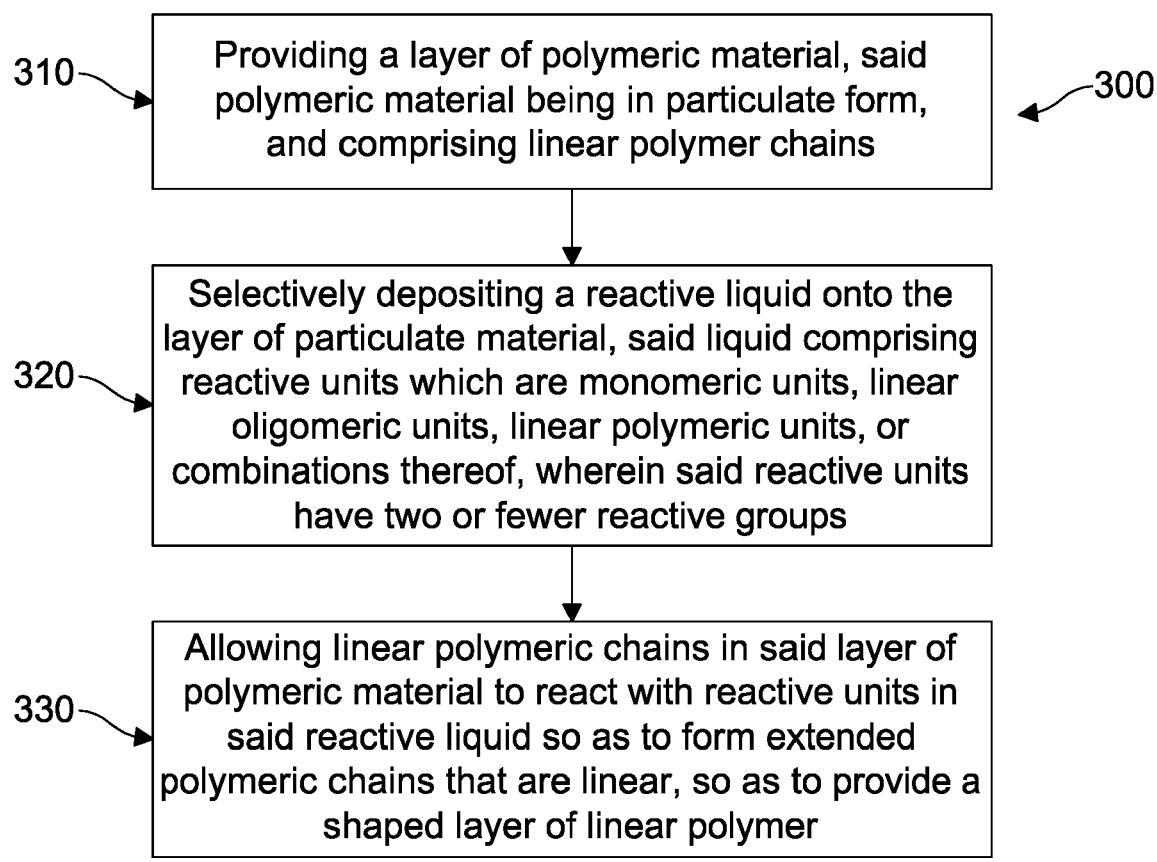
FIG. 3 shows a flow-chart of the disclosed additive manufacturing method.

FIG. 3 illustrates the method 300 of fabricating an object by additive manufacturing disclosed herein. The particulate material and liquid used may be those described with respect to FIG. 2, or may be alternatives having the same or equivalent reactive capabilities.

A layer of a particulate polymeric material 100 is obtained 310.

In the embodiment being described, the particulate polymeric material 100 is obtained and then arranged to form a layer in a bed. The particulate polymeric material 100 is compressed to form a dense, even layer within the bed in the embodiment being described. In alternative embodiments, the particulate material 100 may not be compressed.

In the embodiment being described, the bed is horizontal and flat; however other shapes may be used depending on the desired shape of the object to be formed.

A liquid 200 capable of reacting with the particulate polymeric material so as to form a thermoplastic polymer by polymerisation between the liquid and the polymeric material is obtained and selectively deposited 320 onto the layer of particulate material 100.

The liquid 200 is selectively deposited 320 onto the particulate polymeric material 100 so as to form a thermoplastic polymer by polymerisation 330 between the liquid and the polymeric material. In the embodiment being described, the reaction time between the polymeric material 100 and the liquid 200 is a few seconds, without any energy input (e.g. laser, UV light or heat for curing).

The liquid 200 is deposited 320 in the shape of the object to be made. When the object can be made from a single layer, the method 300 is terminated after a single application of the liquid 200. Excess the particulate polymeric material 100 can be shaken or brushed off the finished object when it is removed from the bed.

Figure 4:
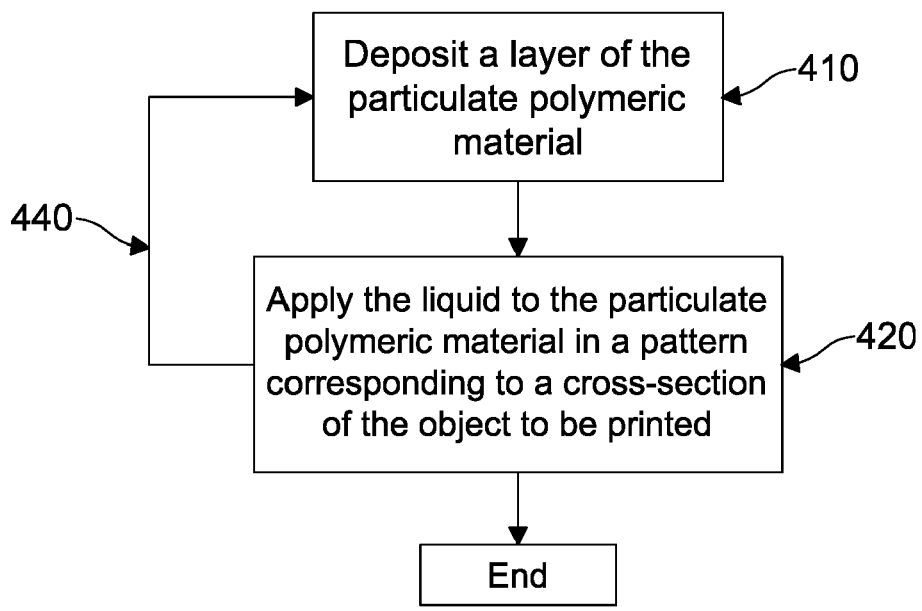
FIG. 4 shows a flow-chart illustrating the optional recursive nature of the disclosed method, as multiple layers of an object are built up.

In some embodiments, the object to be made is sized and/or shaped such that multiple layers are deposited to form it. In such cases, the method 400 illustrated in FIG. 4 is used.

In the embodiment being described, the selective deposition 320/420 of the method 400 comprises depositing the liquid 200 in the shape of a cross-section of the object to be formed.

A further layer of the particulate material 100 is then deposited 410 on top of the first layer.

The liquid 200 is then selectively deposited 420 on the new layer; it is applied to the particulate polymeric material 100 in a pattern corresponding to a second cross-section of the object to be printed.

These steps 410, 420 are then repeated 440 until the object is complete, at which point the method 400 is terminated.

In the embodiment being described, the same liquid 200 is used throughout the method 400 so as to form an object with uniform material properties. In alternative embodiments, the liquid 200 is varied in consecutive layers to produce graded material properties. In alternative or additional embodiments, the particulate material 100 is varied between layers.

The object can then be removed from the bed and any excess particulate polymeric material 100 removed.

In the embodiment being described, no external energy input is used to cause or accelerate the reaction between the particulate material 100 and the liquid 200. The reactions occur spontaneously on contact between the particulate material 100 and the liquid 200 with a reaction time of a few seconds. In some alternative embodiments according to FIG. 3 and/or to FIG. 4, heat and/or other radiation may be used to accelerate the polymerisation reactions.

Figure 6:
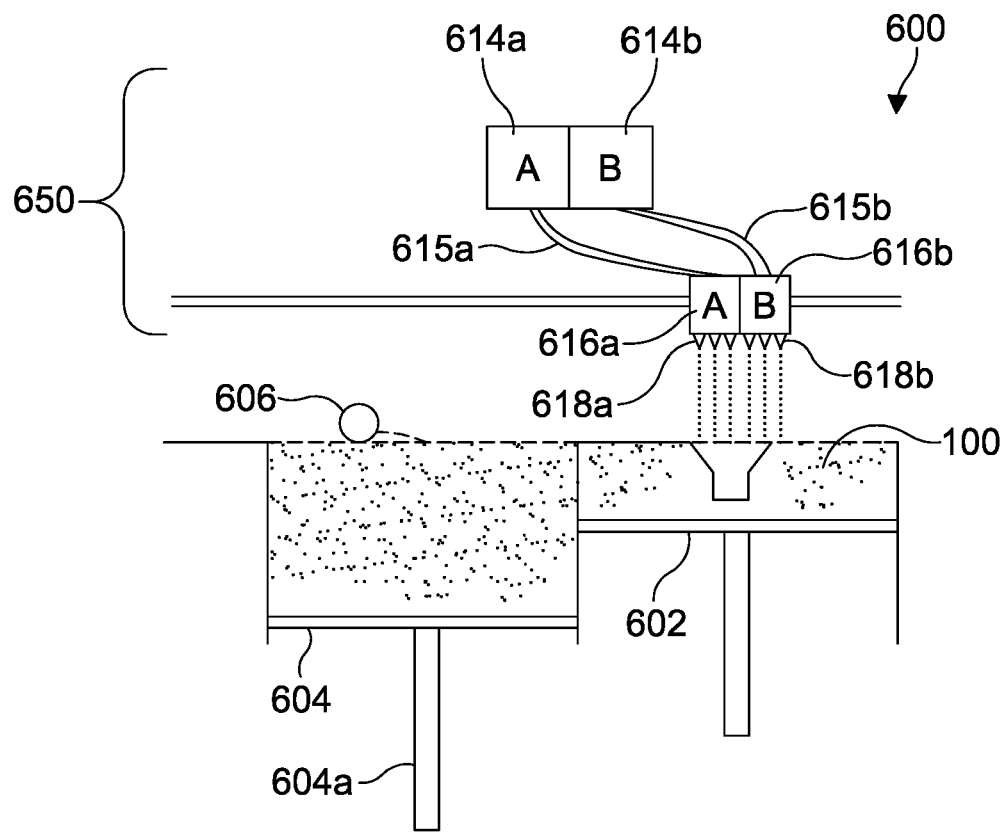
FIG. 6 shows the apparatus of an embodiment of the invention.

FIG. 6 shows a schematic example of apparatus 600 used for additive manufacturing according to the invention.

The apparatus 600 includes a powder bed 602 arranged to hold a layer of the particulate polymeric material 100. The polymeric material is supplied to the bed 602 by a powder supply 604 (which may also be referred to as a particulate polymeric material supply). The powder supply 604 comprises a powder store or hopper 604 adjacent to the powder bed 602. The base 604a of the powder store can be raised to raise the level of the powder relative to the bed such that a roller 606 can transfer powder from the supply 604 to the bed 602.

In alternative embodiments, powder may be stored in a powder store not adjacent to the powder bed 602 and a supply line may be provided between the powder store and the powder bed. The supply line in such embodiments is arranged to allow the particulate material 100 to be introduced to the bed 602 from the powder store.

In the embodiment being described, the powder bed 602 has a levelling roller 606, arranged to compress and flatten the layer of the particulate material 100 formed within the bed 602. The levelling roller 606 also fulfils the purpose of transferring powder from the supply 604 to the bed 602. In alternative embodiments, alternative or additional levelling and/or compressing means may be provided, or no levelling or compressing means.

The liquid 200 is contained in a liquid supply means 614a,b. The liquid supply 614 comprises two separate reservoirs 614a, 614b and two separate supply lines 615a, 615b. A different liquid 200 may be contained in each reservoir. The supply line 615a is arranged to transport liquid 200 from the reservoir 614a to one or more nozzles 618a. In alternative embodiments, the liquid supply 614a may comprise a cartridge directly connected to a nozzle 618a, without an intervening supply line. In alternative embodiments, only a single reservoir, supply line and nozzle may be used.

The nozzles 618 are arranged to transfer the liquid 200 onto the layer of particulate material 100 in the bed 602. In the embodiment being described, the liquid 200 is jetted onto the particulate material 100.

The nozzles 618a,b are connected to an actuated support 616a,b. The actuated support 616a,b is controlled by a processor (not shown) which is connected to the actuated support via communication pathway (not shown). The communication pathway may be a wired or wireless connection. The sets of nozzles 618a, 618b may be separately moveable along the actuated support. In alternative embodiments, only a single nozzle may be provided for each supply line.

The processor is arranged to move the actuated support 616 and control the flow rate of liquid 200 through the nozzles 618a,b so as to control the deposition of liquid onto the layer of particulate material 100. The processor may control flow rate in a binary manner (i.e. no flow, or flow of a set non-zero rate) or may be able to select flow rates from a discrete or continuous range.

In the embodiment being described, the actuated supports 616a,b are moved to move the nozzle 618a,b. In alternative or additional embodiments, the bed 602 may be moved with respect to the nozzles 618a,b.

The combination of the nozzles 618a,b, actuated supports 616a,b and processor form a printing architecture 650. The printing architecture 650 allows the liquid 200 to be deposited onto the particulate material 100 in a controlled manner. In alternative embodiments, the processor may be removed and the printing architecture 650 supplied with manual controls instead.

In the embodiment being described, the processor also controls the powder supply 604a,b so as to apply subsequent layers of the particulate material 100 once liquid 200 has been applied to the first layer and allowed time to react. In alternative embodiments, the powder supply 604a,b may be controlled by a separate processor, or manually.

Instructions are provided to the processor to control the relative movement of the nozzles 618a,b and the bed 602 so as to deposit the liquid 200 in selected regions of the bed 602.

In alternative or additional embodiments, different numbers of reservoirs 614a, 614b and/or supply lines 615a,b and/or nozzles 618a,b are provided. Each supply means 614 may contain a different liquid. In such embodiments, the processor can select which supply means 614, and therefore which liquid, to use, or can use two or more liquids concurrently. In this way, materials can be altered between objects and/or between areas or layers of a single object.

The apparatus 600 shown in FIG. 6 can be used to implement the method of FIG. 3 and the method of FIG. 4.

The apparatus 600 shown in FIG. 6 may be best suited for batch processes. The method disclosed herein is also suitable for use in continuous processes. For example, apparatus as described in US 2012/0059504 A1 and US 2014/0178585 could be modified for carrying out the present method in a continuous manner.

SPECIFIC EXAMPLE:

Powder Preparation

A two necked round bottom flask was dried in an oven at 50° C. for 1 hour and purged with nitrogen for 15 minutes. 100 mL of anhydrous toluene was filled into the flask. The catalyst dibutyl tin dilaurate (2 wt %) and 1,4-butanediol (0.05 mol) was added into the reactor respectively. The reactants were then stirred at 500 rpm for 30 minutes. 0.05 mol hexamethylene diisocynate was then added dropwise over 2 hours. After another 1 hour reaction, the latex was removed by the sampling outlet and then dried under vacuum.

Reactive Liquid Preparation

Hexamethylene diisocynate was mixed with poly(hexamethylene diisocyanate) at 50 wt %:50 wt % and dibutyltin dilaurate (4% w/w) as catalyst and used as reactive liquid A.

Commercial pure 1,4-butanediol was used as reactive liquid B.

Printing

Apparatus of the type described above was used.

The environment chamber was heated to 50° C. and a layer of powder was spread onto the target surface.

One layer of reactive liquid A was printed onto the powder bed at a chosen dpi. Then one layer of reactive liquid B was printed on top of liquid A.

A new layer of powder was then spread on top.

The process was repeated until the final 3D printed product was formed. The product was a polyurethane with good homogeneity and low porosity.

The invention claimed is:

1. A method of fabricating an object by additive manufacturing, the method comprising:
   a) providing a layer of polymeric material, said polymeric material being in particulate form, and comprising linear polymer chains,
   b) selectively depositing a reactive liquid onto the layer of particulate polymeric material, said reactive liquid comprising reactive units which are monomeric units, linear oligomeric units, linear polymeric units, or combinations thereof, wherein said reactive units have two or fewer reactive groups,
   c) allowing linear polymeric chains in said layer of polymeric material to react with reactive units in said reactive liquid so as to form extended polymeric chains that are linear, so as to provide a shaped layer of linear polymer, and d) repeating steps a) to c) as required to form the object from successive shaped layers of linear polymer.

2. The method of claim 1, wherein the monomeric units and/or linear oligomeric units, and/or linear polymeric units that are provided as reactive units in step b) are bi-functional.

3. The method of claim 1, wherein the reactive liquid comprises reactive units which are monomeric units.

4. The method of claim 1, wherein the particulate polymeric material provided in step a) and the shaped layer of linear polymer obtained in step c) are both formed from the same type of polymer.

5. The method of claim 1, wherein the reactive liquid comprises monomeric units and/or oligomeric units based on the same monomer type or the same repeating unit type or the same linking group type as the linear polymer chains that are in the particulate polymeric material.

6. The method of claim 1, wherein
a) the linear polymeric chains have reactive functional groups available which are hydroxyl groups or amino groups, and the reactive units in the reactive liquid have reactive functional groups available that can react with hydroxyl groups or amino groups respectively; or
b) the reactive units in the reactive liquid have reactive functional groups available which are hydroxyl groups or amino groups, and the linear polymeric chains have reactive functional groups available that can react with hydroxyl groups or amino groups respectively.

7. The method of claim 1, wherein the particulate polymeric material is a thermoplastic polymeric material.

8. The method of claim 1, in which the particulate polymeric material comprises at least one of the following polymer types: (i) polyurethane; (ii) polyurea; (iii) polycarbonate; (iv) polyamide; (v) polyester; and (vi) polyether.

9. The method of claim 8, in which the particulate polymeric material comprises at least one of the following polymer types: (i) polyurethane; and (ii) polyurea.

10. The method of claim 1, in which the reactive liquid and the particulate polymeric material undergo linear polymerisation when in contact at room temperature and pressure.

11. The method of claim 1, wherein two or more reactive liquids are used.

12. The method of claim 1, comprising selectively depositing the liquid in a pattern corresponding to a cross-section of the object to be fabricated and repeating steps a) to c) to form the object from successive shaped layers of linear polymer.

13. The method of claim 1, in which the monomeric units and/or oligomeric units in the reactive liquid react with each other, in addition to reacting with polymeric chains in the particulate polymeric material.

14. The method of claim 1, in which the method is performed without any crosslinking agent or provision of a curing light source, such as a UV or infra-red light source.

15. A kit of parts for use in fabricating an object by additive manufacturing, the kit of parts comprising:
polymeric material, said polymeric material being in particulate foul", and comprising linear polymer chains,
reactive liquid comprising reactive units which are monomeric units, linear oligomeric units, linear polymeric units, or combinations thereof, wherein said reactive units have two or fewer reactive groups, wherein linear polymeric chains in said layer of polymeric material are able to react with reactive units in said reactive liquid so as to form extended polymeric chains that are linear, so as to provide a shaped layer of linear polymer.

16. The kit of parts of claim 15, in which at least one of the particulate polymeric material and the reactive liquid is provided in a container suitable for insertion into a user's additive manufacturing apparatus.

17. An apparatus for fabricating an object by additive manufacturing, the apparatus comprising:
a bed arranged to contain polymeric material, said polymeric material being in particulate form, and comprising linear polymer chains;
a powder supply containing the particulate polymeric material and arranged to provide the particulate polymeric material to the bed;
a liquid supply containing reactive liquid comprising reactive units which are monomeric units, linear oligomeric units, linear polymeric units, or combinations thereof, wherein said reactive units have two or fewer reactive groups; and
printing architecture arranged to selectively deposit reactive liquid onto the particulate polymeric material, wherein linear polymeric chains in said layer of polymeric material are able to react with reactive units in said reactive liquid so as to form extended polymeric chains that are linear, so as to provide a shaped layer of linear polymer.

18. The apparatus of claim 17, comprising one or more additional liquid supplies, each containing a reactive liquid which can react with the particulate polymeric material so as to form a linear polymer with one or more properties different from that of the linear polymer formed by reaction of the particulate polymeric material with the reactive liquid in the first liquid supply.

19. A method of using an additive manufacturing machine that comprises the apparatus of claim 17, and an energy source arranged to cure an object being fabricated, the method comprising:
putting polymeric material, said polymeric material being in particulate form, and comprising linear polymer chains, into the powder supply;
putting reactive liquid comprising reactive units which are monomeric units, linear oligomeric units, linear polymeric units, or combinations thereof, wherein said reactive units have two or fewer reactive groups, into the liquid supply; and
causing the printing architecture to selectively deposit the reactive liquid on the particulate polymeric material to form a linear polymer by reaction between the reactive liquid and the polymeric material,
without using the energy source, wherein linear polymeric chains in said layer of polymeric material are able to react with reactive units in said reactive liquid so as to form extended polymeric chains that are linear, so as to provide a shaped layer of linear polymer.

20. A 3D polymeric object, the object being obtainable by the method of claim 1.

* * * * *